United States Patent
Aigner et al.

(10) Patent No.: US 11,504,884 B2
(45) Date of Patent: Nov. 22, 2022

(54) DEVICE FOR COOLING PARTICULATE MATERIALS

(71) Applicant: EREMA Engineering Recycling Maschinen und Anlagen Gesellschaft M.B.H., Ansfelden (AT)

(72) Inventors: Michael Aigner, Leonding (AT); Christian Wagner, Neumarkt im Muehlkreis (AT); Roland Huber, St. Pantaleon (AT); Klaus Feichtinger, Linz (AT)

(73) Assignee: EREMA Engineering Recycling Maschinen und Antagen Gesellschaft m.b.H., Ansfelden (AT)

( * ) Notice: Subject to any disclaimer, the term of this patent is extended or adjusted under 35 U.S.C. 154(b) by 0 days.

(21) Appl. No.: 17/602,231

(22) PCT Filed: Apr. 9, 2020

(86) PCT No.: PCT/AT2020/060143
§ 371 (c)(1),
(2) Date: Oct. 7, 2021

(87) PCT Pub. No.: WO2020/206477
PCT Pub. Date: Oct. 15, 2020

(65) Prior Publication Data
US 2022/0143871 A1    May 12, 2022

(30) Foreign Application Priority Data
Apr. 12, 2019   (AT) .............................. A 50334/2019

(51) Int. Cl.
*B29B 13/04*    (2006.01)
*B29B 9/16*    (2006.01)
*B29B 9/06*    (2006.01)

(52) U.S. Cl.
CPC .............. *B29B 13/045* (2013.01); *B29B 9/16* (2013.01); *B29B 9/06* (2013.01)

(58) Field of Classification Search
CPC .. B29B 9/16; B29B 9/06; B29B 9/065; B29B 2009/166; B29B 13/045; B04C 5/04;
(Continued)

(56) References Cited

U.S. PATENT DOCUMENTS

| | | | |
|---|---|---|---|
| 2,067,710 A | 1/1937 | Jacobsen | |
| 2002/0008072 A1 | 1/2002 | Conrad et al. | |
| 2007/0079582 A1* | 4/2007 | Oh ........................ | A47L 9/1683 55/345 |
| 2018/0326326 A1* | 11/2018 | Opawale .............. | B01D 21/265 |

FOREIGN PATENT DOCUMENTS

| | | |
|---|---|---|
| CH | 616 362 A5 | 3/1980 |
| DE | 36 18 272 A1 | 12/1987 |

(Continued)

OTHER PUBLICATIONS

International Search Report dated Jun. 29, 2020 of corresponding International Application No. PCT/AT2020/060143 (six pages).
(Continued)

*Primary Examiner* — Mary Lynn F Theisen
(74) *Attorney, Agent, or Firm* — Kilpatrick Townsend & Stockton LLP

(57) ABSTRACT

Disclosed is a device for cooling particulate materials or particles, in particular granulates of polymeric materials, having an outer container with an, in particular frustoconical, outer shell surface and an inner container, which is arranged at least in sections in the interior of the outer container, with an, in particular frustoconical, inner shell surface, wherein an intermediate space is formed between the outer shell surface and the inner shell surface, wherein an inlet equipment for introducing a gas flow as well as the particles into the intermediate space is provided in an inlet-side initial region of the device, and wherein an outlet (Continued)

Figure 1:
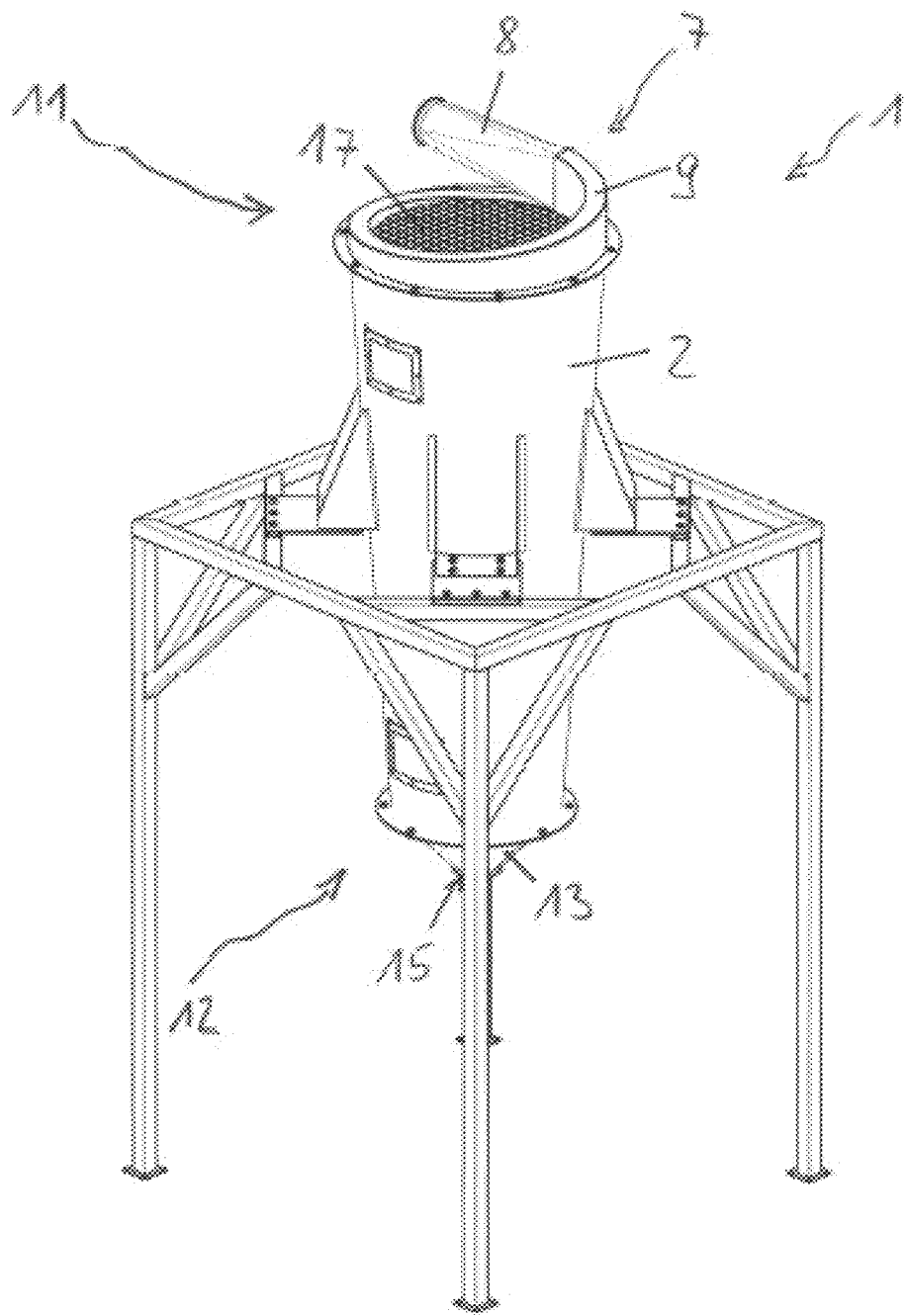

opening for the particles is provided in an outlet-side end region of the device opposite the inlet equipment, wherein the inlet equipment is so arranged and/or designed that the gas flow as well as the particles can be introduced substantially tangentially into the intermediate space.

28 Claims, 6 Drawing Sheets

(58) Field of Classification Search
CPC ......... B04C 5/081; B04C 5/107; B04C 5/103; B65G 53/04; B65G 53/06; B65G 53/08; B65G 53/10; B65G 53/12; F28F 1/12; F28F 1/14
See application file for complete search history.

(56) References Cited

FOREIGN PATENT DOCUMENTS

| | | |
|---|---|---|
| DE | 299 24 229 U1 | 8/2002 |
| FR | 2 670 137 A1 | 6/1992 |
| JP | 2003-011121 A | 1/2003 |

OTHER PUBLICATIONS

International Preliminary Report on Patentability completed Jun. 24, 2021 in related International Application No. PCT/AT2020/060143 (seven pages).

* cited by examiner

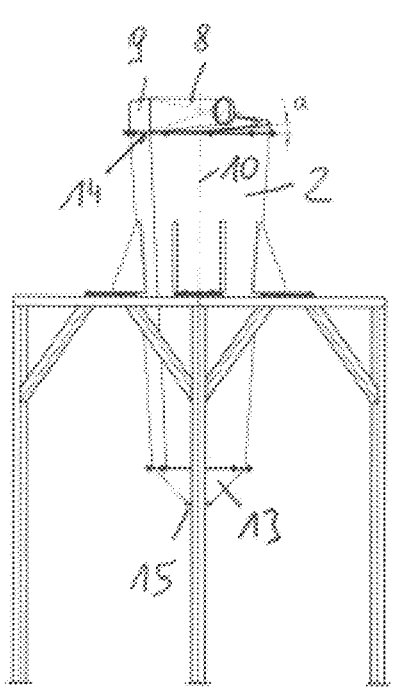
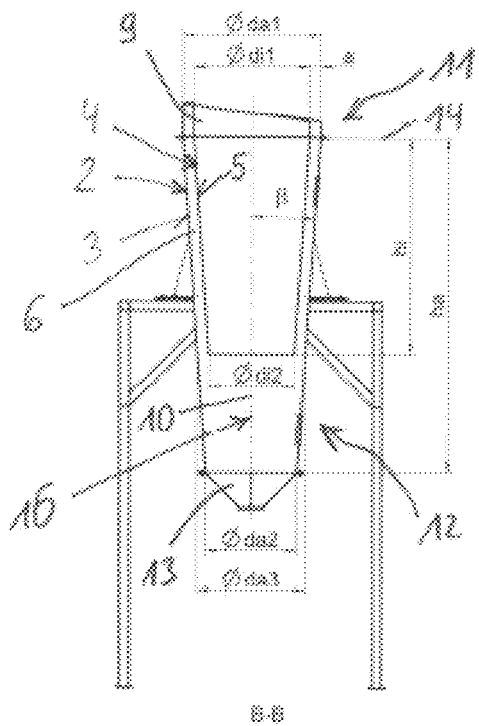
Fig. 2  Fig. 3
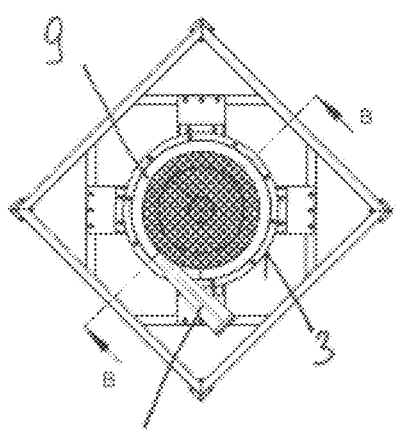
Fig. 4

DEVICE FOR COOLING PARTICULATE MATERIALS

This application is a U.S. National Phase Application of PCT/AT2020/060143, filed Apr. 9, 2020, which claims the priority of Austrian Patent Application A 50334/2019, filed Apr. 12, 2019, the entireties of which are incorporated by reference herein.

The present invention relates to a device for cooling particulate materials, in particular granulates of polymeric materials.

Granulates are produced, for example, by plasticising polymeric materials in an extruder. The strand-like polymer melt emerging via a perforated plate is then cut into particles of small size by rotating knives. These granulates, in which at least the core area is still in melt, are then cooled and solidified in the gas or water flow and simultaneously transported away with the fluid flow.

Subsequent further cooling of the particles then takes place, for example, in further downstream cooling units. Cylindrical cooling containers are known from the prior art, for example, in which the granulates are moved and cooled in the process.

It is the object of the present invention to create such a cooling unit in which the residence time of the granulates can be kept as high as possible and the residence time spectrum of the individual particles can be kept narrow, and the particles are kept singled out.

The present invention solves this object by means of a device according to the features herein. In accordance with the invention, it is provided that the 20 device comprises: an outer container with an, in particular frustoconical, outer shell surface, and an inner container, arranged at least in sections in the interior of the outer container, with an, in particular frustoconical, inner shell surface, wherein an intermediate space is formed between the outer shell surface and the inner shell surface. In the inlet-side initial region of the device, an inlet equipment 25 is provided for introducing a gas flow as well as the particles or granulates into the intermediate space, wherein an outlet opening for the particles is provided in the outlet-side end region of the device opposite the inlet equipment. The inlet equipment is arranged and/or designed in such a way that the gas flow and the particles can be introduced into the intermediate space essentially tangentially.

The special tangential introduction of the gas flow or the particles and their resulting movement through the intermediate space between the outer shell surface and the inner shell surface extends the path that the particles have to take through the device and thus supports the increase in the residence time. At the same time, the residence time spectrum of the particles is kept narrow. The air flow guided in this way also keeps the gas sufficiently laminar and there is no turbulence. The particles are thus kept in a narrow velocity range and uncontrolled collisions, which would lead to a deceleration of the particles, are reduced.

Furthermore, contact of the particles with the walls is also minimised and deceleration and/or deposition of the particles is prevented. Adhesion of the granulate particles to the wall is also avoided. It is particularly advantageous that sticking of the granulate particles to each other is also prevented to the greatest possible extent.

The particles are transported by a medium, in particular a gas, which is passed through the arrangement. This gas can be any gas or gas mixture, in particular air is used. The gas flow transports the particles, wherein these material particles or granulates or sausages or the like are thereby cooled with the aid of the gas flow, and optionally further solidified, and optionally further chemically reacted out, e.g. by thermal influence, cooling or by a reaction initiated or induced by the gas. Evaporating media can also be used, such as e.g. water.

The arrangement according to the invention can be used for all materials for which it is feasible to form strands into a granulate. These include polymers, doughs, ceramic masses, rubber, thermoplastic polyurethanes, silicones, etc. The granulated materials may be reinforced with fibres and/or may also be partially cross-linked. They can be based on polyesters, polyolefins or even polyamides. In particular, it is also possible to transport all at least partially plasticisable, preferably extrudable, materials which can be softened or melted and converted into particles or solidified with the arrangement according to the invention and to cool them during transport, among other things.

Advantageous further developments of the device result from the features of the dependent claims.

For example, it is advantageous for design reasons when it is provided that the outer shell surface and/or the inner shell surface are arranged substantially rotationally symmetrically about a central longitudinal axis.

The device is usually set up vertically, but it can also be set up lying down or horizontally or, depending on convenience, in an inclined position.

To achieve an advantageous gas flow, it is advantageous when the outer shell surface and/or the inner shell surface is inclined relative to a central longitudinal axis by a cone angle $\beta$, wherein the cone angle is in the range of $1° <= \beta <= 15°$, in particular in the range of $3° <= \beta <= 10°$, preferably in the range of $3° <= \beta <= 6°$. This helps to keep the air flow sufficiently high and causes the particles to remain singled out in the intermediate space for a particularly long time and also to allow specifically heavier particles to remain in the cooling funnel for a correspondingly long time.

A disturbance-free flow can be achieved when the outer shell surface and the inner shell surface are spaced apart from each other on all sides without contact.

An advantageous residence time also results when it is provided that the width of the intermediate space between the outer shell surface and the inner shell surface is in the range of 20 mm $<= a <=$ 200 mm, in particular in the range of 50 mm $<= a <=$ 100 mm, preferably in the range of 60 mm $<= a <=$ 80 mm. This also causes the particles to remain in the intermediate space for a long time and singled out. Too large a distance would result in too little air flow in the direction of the circumference and thus a reduction in the residence time of the particles. A gap that is too narrow would increase the air velocity and the density of the particles, wherein this would result on the one hand in shorter residence time but also in higher collision and hit probability of the particles among each other.

In this context, it is advantageous when the size or diameter of the granules or particles is also taken into account when selecting the width a of the intermediate space 6. An advantageous width a is in the range between 4 and 40 times the average diameter of the particles.

According to an advantageous embodiment, it is provided that the outer shell surface and the inner shell surface are aligned parallel to each other.

Alternatively, it may be provided that the width of the intermediate space between the outer shell surface and the inner shell surface decreases in the direction of the outlet-side end region, in particular uniformly. Such a taper of the intermediate space is particularly advantageous for smaller particles, as the accelerating effect of the gas flow through the narrower intermediate space is used to maintain the separating effect.

Alternatively, it can also be provided that the width of the intermediate space between the outer shell surface and the inner shell surface increases in the direction of the outlet-side end region, in particular uniformly. Conversely, an intermediate space that increases in height also has advantages for larger particles, since the braking effect caused by collisions with the walls is reduced and thus the separation can also be easily maintained.

The inner container or inner shell surface is shorter or less high than the outer container or outer shell surface. In this context, it has proved advantageous when the length or height of the outer container or outer shell surface is greater than the length or height of the inner container or inner shell surface. It is particularly advantageous when the ratio hi:ha is in the range of 0.1 to 1, in particular in the range of 0.3 to 0.85, preferably in the range of 0.50 to 0.75.

In order to be able to advantageously place or connect the inlet equipment to the device, it is favourable when the outer shell surface and the inner shell surface are flush at their inlet-side initial regions.

Furthermore, it is advantageous when the diameter of the outer shell surface at the inlet-side initial region is larger than its diameter at the outlet-side end region or that the outer container tapers in the direction of the outlet-side end region.

Similarly, this is also advantageous for the inner container, namely when it is provided that the diameter of the inner shell surface at the inlet-side initial region is larger than its outlet-side diameter at the outlet-side end region or that the inner container tapers in the direction of the outlet-side end region.

Thus, a more uniform flow velocity, a beneficial residence time and a beneficial residence time spectrum can be achieved when the outer shell surface and the inner shell surface taper in the direction of the outlet-side end region.

For an effective separation of the particles from the gas flow, it is advantageous when the outer shell surface extends further or is longer than the inner shell surface in the direction of the outlet-side end region. As a result, there is a separation region in this section of the device near the outlet, in which the inner container is already at its end and there is also no longer a defined intermediate space. This separation region is only limited by the outer container or the outer shell surface. There, too, the particles continue to move along the outer shell surface in a spiral until they reach the outlet. The gas flow, on the other hand, is discharged at the end of the intermediate space or in the separation region in the opposite direction, i.e. in the direction of the inlet, via the inner container and the particles are thus separated from the gas flow.

For the separation of the particles from the gas flow, it is advantageous when the inner shell surface is open or gas-permeable at its end close to the inlet-side initial region and that the gas can thus be drawn off through this opening of the inner shell surface close to the inlet-side initial region. This opening can be provided with a gas-permeable cover surface, for example by a grid.

The separation of the particles is assisted by the continuation of the outer shell surface in comparison to the inner shell surface. In this context, it is particularly advantageous for effective separation of the particles from the gas when the opening of the outer shell surface defined by the diameter at the outlet-side end region or the area defined by the diameter of the outlet opening is reduced relative to the opening of the inner shell surface defined by the diameter at the outlet-side end region in such a way that sufficient flow resistance is formed for the gas.

The outer shell surface can therefore be tapered until the outlet opening defined by the outlet-side opening is so small and offers so much resistance that hardly any gas or air can escape from this opening and the gas has to take the path via the inner container to escape. However, this requires a greater overall height and is sometimes impractical for design reasons.

An advantageous arrangement in this respect, particularly in the case of vertical installation, is that an additional, tapered, in particular frustoconical, outlet nozzle is arranged at the outlet-side end region of the outer shell surface, i.e. at the outlet-side opening, in which the actual outlet opening is then provided, via which the particles exit the device. This outlet nozzle has steeper angles of the walls and thus tapers more quickly over the height. This results in good gas separation with a small overall height. The outlet-side opening of the outer shell surfaces is thus reduced, because the outlet opening has a much smaller area. In this context, it is particularly advantageous for good separation of the particles from the gas flow when the area of this outlet opening is $<=20\%$, preferably $<=10\%$, of the area of the opening of the outer shell surface defined by the diameter at the outlet-side end region.

For achieving the tangential flow in the intermediate space, it is advantageous when the inlet equipment has an inlet channel and, in particular, an inlet nozzle arranged upstream thereof, via which the gas flow as well as the particles to be cooled can be supplied. The inlet channel is curved to save space and has the same width as the intermediate space. The inlet channel runs parallel to the circumference of the outer shell surface and the inner shell surface, and thus opens into the intermediate space essentially tangentially.

The gas or particle flow directed in this way thus moves on the one hand tangentially to the inner or outer circumference of the intermediate space, but is also advantageously introduced at a low angle of entry. In this context, it is advantageous when the inlet channel opens into the intermediate space at an angle $\alpha$ with respect to a plane oriented normal to the longitudinal axis, wherein this angle of entry $\alpha$ is in the range of $0<\alpha<=10°$. It is particularly advantageous for the flow conditions when the inlet channel is constantly inclined at this angle over its entire longitudinal extent. By forming such a directional orientation, it is possible to generate a directed particle movement even in the case of a demand for high quantities of media.

This angle of entry $\alpha$ is thus understood to be the essential direction of flow of the gas as well as of the particles or particulates. This entry angle is then also maintained at least in the initial section over the further course of the particles in the intermediate space.

In this way, the particles or gas flow into the intermediate space both tangentially and slightly in the direction of the outlet. This results in a movement pattern that is advantageous for the residence time, the residence time spectrum and the separation, as can be seen for example in FIG. 6. The particles thus move from the inlet-side initial region along spiral paths to the outlet-side end region, wherein the diameter of these spiral paths becomes smaller and smaller.

The quantity or speed of the gas flow is usually adapted to the requirements and the particle sizes. In this context, it can be advantageous when an additional quantity of gas is introduced. In this context, it is advantageous when additional gas inlet openings are formed in the outer shell surface and/or in the inner shell surface, which are arranged and/or formed in such a way that additional gas, but not particles, can advantageously also be introduced essentially tangentially into the intermediate space via these gas inlet openings. The additional gas flow supports the primary gas flow via the inlet equipment, thus leading to further cooling of the particles and influencing the residence time. This means that, for example, cold gas can also be introduced into the funnel in order to cool it further accordingly. Reactive gas can also be introduced here to initiate specific reactions.

Further advantages and embodiments of the invention will be apparent from the description and the accompanying drawings.

The invention is schematically illustrated below with reference to particularly advantageous, but not limiting, examples of embodiments shown in the drawings, and is described by way of example with reference to the drawings.

Figure 3A:
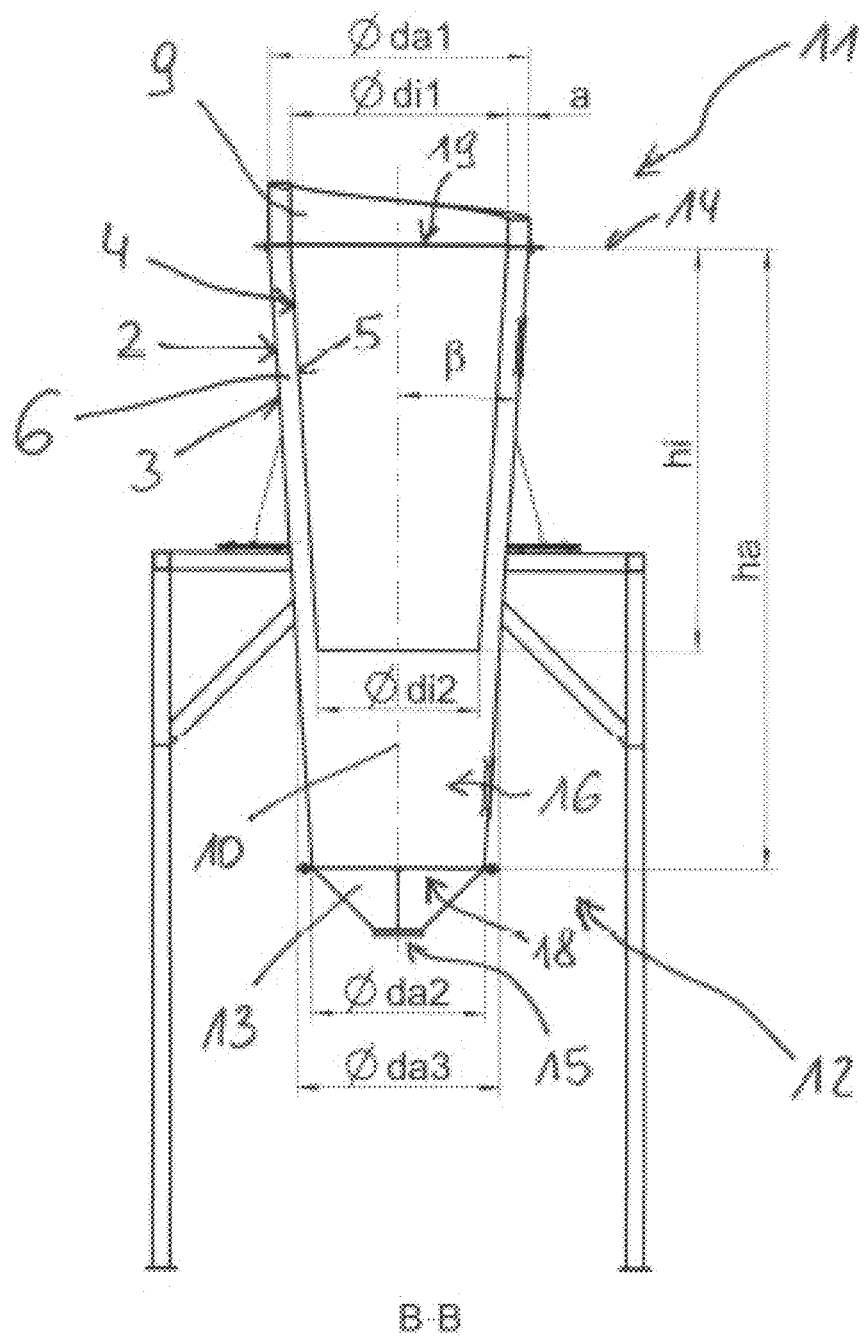
Figure 5:
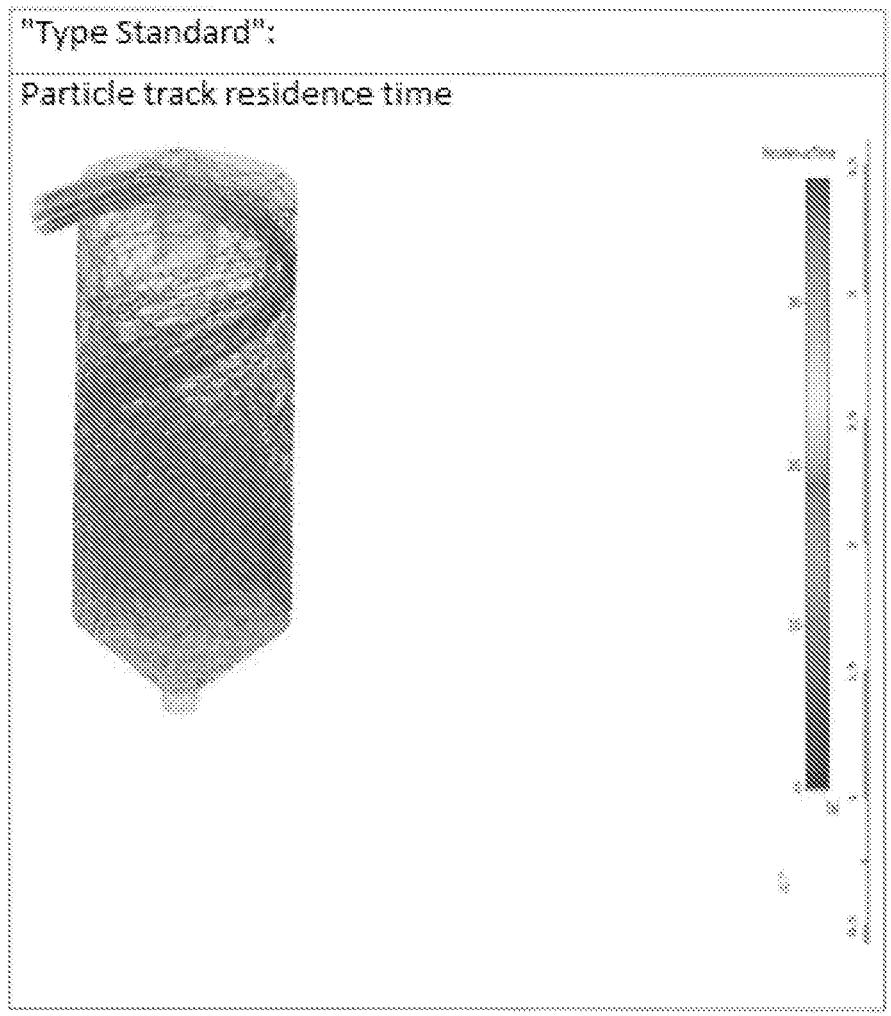

The following show schematically:

FIG. 1 a device according to the invention in perspective view,

FIG. 2 a side view of the device according to FIG. 1,

FIG. 3 or 3a a section B-B through this device,

FIG. 4 a top view from above,

FIG. 5 a test with a known comparison equipment

Figure 6A:
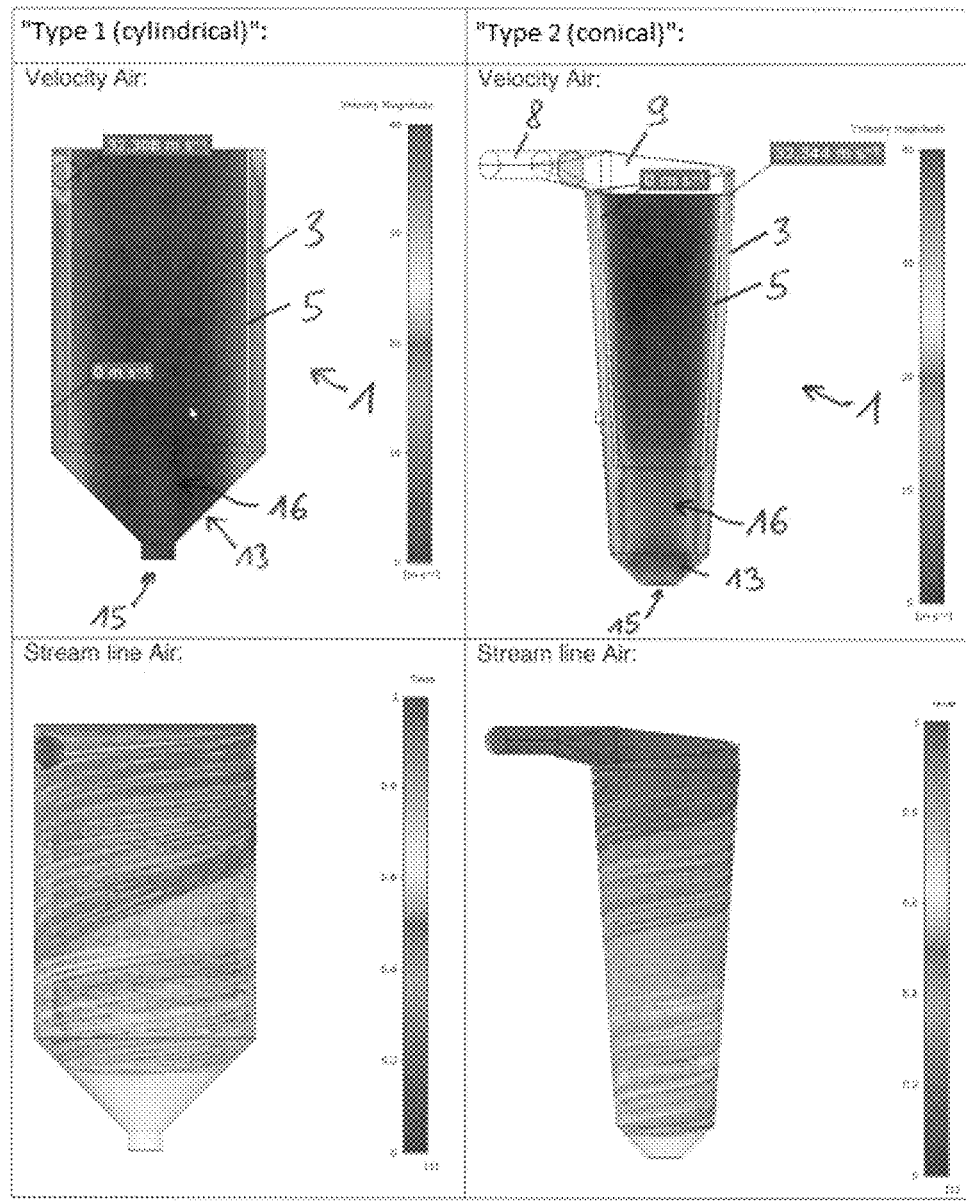
Figure 6B:
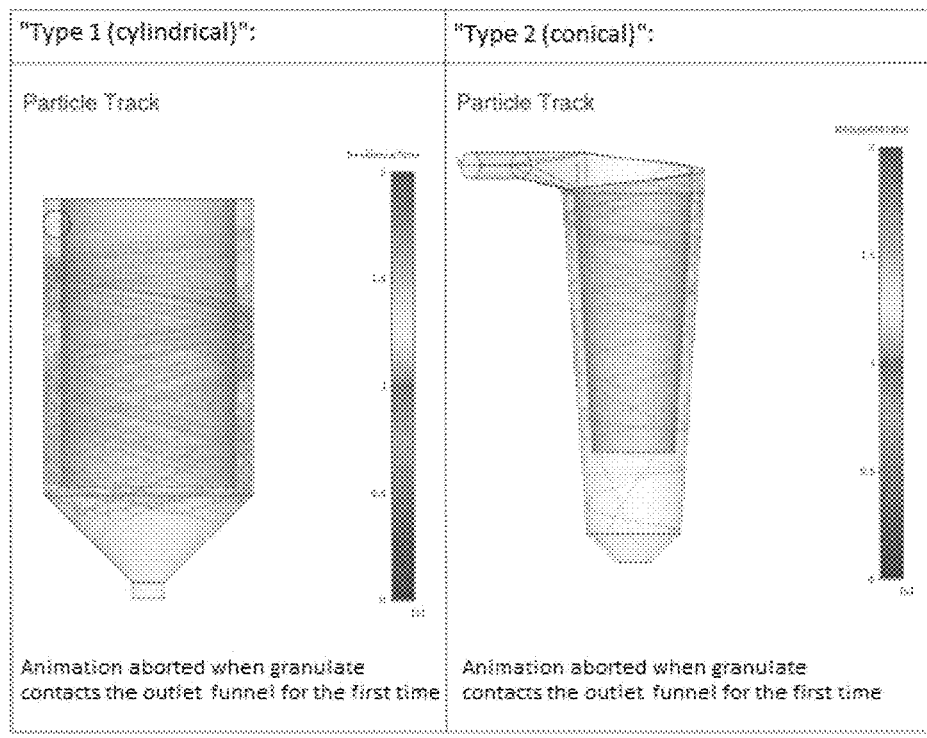

FIGS. 6a, 6b tests with two cooling equipments according to the invention.

FIGS. 1 to 4 show the device 1 according to the invention from different perspectives. In the present embodiment, the device 1 is positioned vertically, namely in a support frame. An inlet equipment 7 is arranged in the uppermost region of the device 1 for introducing the gas or particle flow. This upper section of the device 1 is defined as the inlet-side initial region 11. The section of the device 1 opposite the inlet equipment 7 is defined as the outlet-side end region 12. This is also where the outlet opening 15 is located, from which the particles leave the device 1.

The device 1 comprises an outer container 2 and an inner container 4 arranged therein. The outer container 2 has a frustoconical outer shell surface 3, the inner container 4 has a frustoconical inner shell surface 5. The inner container 4 is arranged in the outer container 2 in such a way that an intermediate space 6 is formed between the outer shell surface 3 and the inner shell surface 5. The width of the intermediate space between the outer shell surface 3 and the inner shell surface 5 is about 70 mm in the present case.

The outer shell surface 3 and the inner shell surface 5 are continuously spaced from each other and do not touch at any point. Accordingly, the intermediate space 6 is barrier-free and a frustoconical annular space is formed in which the gas flow and the particles circulate in a spiral.

The outer shell surface 3 and the inner shell surface 5 are inclined relative to a central longitudinal axis 10 by the cone angle β. In the present example of an embodiment, the cone angle β is about 5°.

In the present example of an embodiment, the outer shell surface 3 and the inner shell surface 5 are aligned parallel to each other. However, it may be advantageous to deviate from a parallel alignment and, for example, to provide for an increase or a decrease in the gap width.

It can be seen that the outer shell surface 3 and the inner shell surface 5 taper in the direction of the outlet-side end region 12, i.e. here towards the bottom. Accordingly, the diameter da1 of the outer shell surface 3 at the inlet-side end region 11 is larger than the diameter da2 of the outer shell surface 3 at the outlet-side end region 12 or, in this case, the lower opening 18 of the outer shell surface 3.

Similarly, the diameter di1 of the inner shell surface 5 at the inlet-side initial region 11 or, in this case, the upper opening 19 of the inner shell surface 5 is larger than the outlet-side end diameter di2 of the inner shell surface 5 at the outlet-side end region 12. The upper, relatively larger opening 19 of the inner shell surface 5 located at the inlet-side initial region 11 is thereby closed by a cover surface 17.

It can also be seen that the outer shell surface 3 has a greater length or height ha than the height hi of the inner shell surface 5. In the device 1 according to FIG. 1 the ratio hi:ha is about 0.6.

This means that in the lower section of the device 1 there is a separation region 16 in which the inner container 4 is already at the end and there is also no longer a defined intermediate space 6. This separation region 16 is only limited by the outer container 2 or the outer shell surface 3.

However, the particles continue to move downwards along the outer shell surface 3 in the separation region 16. The gas flow, on the other hand, is discharged upwards at the end of the intermediate space 6 via the inner shell surface 5. This is where the particles are separated from the gas flow. The particles leave the device 1 at the bottom through the outlet opening 15, the gas leaves the device 1 at the top through the upper opening 19 of the inner shell surface 5. This upper opening 19 is provided with a gas-permeable cover surface 17, in the present case by a grid.

Reducing the diameter of the outer shell surface 3 already increases the flow resistance. If the opening 18 at the lower end of the outer shell surface 3 is small enough, the flow resistance becomes so great that the gas does not exit through this lower opening 18, but rather only via the upper opening 19 of the inner shell surface 5. However, the particles always exit at the bottom and this lower opening 18 can, when it is small enough, also act as an outlet opening 15 at the same time. In most cases, however, this results in a greater overall height of the device 1. Accordingly, the flow resistance can also be further increased by additional design measures. Thus, as can be seen in the example of an embodiment according to FIG. 3a, an additional frustoconical outlet nozzle 13 is arranged at the very bottom of the outlet-side end region 12 of the outer shell surface 3. The actual outlet opening 15 for the particles, from which the particles finally leave the device 1, is also formed in this outlet nozzle 13. The outlet nozzle 13 is directly connected to the lower opening 18 of the outer shell surface 3, wherein the cross-sectional area of the outlet opening 15 is considerably smaller than that of the lower opening 18, in this case only approx. 7-8% of the cross-sectional area of the lower opening 18. Due to this additional cross-sectional constriction, the flow resistance is further increased and the separation of the particles from the gas flow is even more effective.

The inlet equipment 7 arranged in the inlet-side initial region 11 has an inlet nozzle 8 to which, for example, a transport line can be connected, via which the still hot particles or granulates are introduced into the device 1 together with the gas flow.

The inlet nozzle 8 opens into an inlet channel 9. This inlet channel 9 is curved or spirally curved and runs essentially circularly parallel to the circumference of the outer shell surface 3 and the inner shell surface 5. The inlet channel 9 closes the intermediate space 6 at the top or inlet-side. In the present case, with the present diameter of the shell surfaces 3, 5 and with the present angle of inclination a, the inlet channel 9 describes an almost complete circle of almost 360° and then opens into the intermediate space 6, approximately in the region below the inlet nozzle 8. Accordingly, the inlet channel 9 has the same width a as the intermediate space 6. Accordingly, the gas or particle flow is introduced tangentially into the intermediate space 6, i.e. the particles and the gas flow run on approximately circular paths around the central longitudinal axis 10 in the intermediate space 6. In addition, turbulent flows, tear-off edges and impact edges are thus avoided.

At the same time, the inlet channel 9 is also slightly inclined downwards, towards the outlet. This can already be seen from FIG. 1, and the inlet channel 9 runs into the interior of the intermediate space 6 over a surface that is constantly inclined downwards. This inclined angle of entry α is defined with respect to a plane 14 that is aligned normal to the longitudinal axis 10 and is about 5°, as can be seen in FIG. 2.

In this way, the particles or gas flow into the intermediate space 6 not only tangentially, but also directed slightly downwards. This results in a movement pattern such as can be seen in FIG. 6. The particles thus move along spiral paths from the inlet-side initial region 11 to the outlet-side end region 12, wherein the diameter of these spiral paths becomes smaller and smaller.

The following embodiments show tests and results with different cooling equipments in comparison (FIG. 5 and FIG. 6a, 6b):

The tests were performed with the following parameters:
Air volume: 2700 m³/h
Granulate quantity: 85 kg/h
Medium: air
Air temperature inlet: 19° C.
Granulates were always singled out.

| Material + MatNo. | Cyclone | T granulate start [° C.] | T granulate end [° C.] |
|---|---|---|---|
| LDPE | | | |
| 20190227/4 | "Standard" | 137 | 101 |
| 20190227/5 | "Type 2 (conical)" | 137 | 75 |
| LDPE/PP | | | |
| 2019044/10 | "Standard" | 175 | 100 |
| 2019044/9 | "Type 2 (conical)" | 174 | 80 |
| LDPE/PP/CaCO3 | | | |
| 2018220/31 | "Standard" | 171 | 109 |
| 2018220/20 | "Type 2 (conical)" | 173 | 75 |

"Type Standard" (FIG. 5):
Inlet Air: 0.6 kg/s; 20° C.
Inlet Particle: 100 kg/h
D 4 mm; 80 tracks
"Type 1 (cylindrical)" (FIG. 6a, 6b, left column):
Inlet air: 0.6 kg/s; 20° C.
Inlet Particle: 100 kg/h
D 4 mm; 50 tracks
"Type 2 (conical)" (FIG. 6a, 6b, right column):
Inlet air: 0.6 kg/s; 20° C.
Inlet Particle: 100 kg/h
D 4 mm; 50 tracks The tests were performed with different materials and, among other things, the velocity distribution and the residence time spectrum were investigated. The final temperature of the granulate was also used for evaluation.

The cyclone known from the prior art as the "Type Standard" (FIG. 5) is a cylindrical cyclone and a conical end with a tangential air inlet, however without an inner container and without other equipments in the inner area. At the upper end there is an air outlet tube which protrudes approx. ⅓ into the cylinder. Among other things, the particle residence time was simulated for this cyclone. It is clearly visible in FIG. 5 that the particles penetrate very quickly into the lower area of the cyclone, i.e. they do not have a long residence time in the cooling silo, and an accumulation of particles occurs in the lower area or in the area of the outlet funnel. This leads to an increased particle frequency, where sticking can occur and twins and triplets (i.e. two or three granulates sticking to each other) are formed. In addition, this area also heats up and disruptive wall adhesions can occur as a result.

In the cylindrical cooling silo with inner shell "Type 1 (cylindrical)" according to the invention (FIGS. 6a, 6b, left column), it is clearly visible, especially in the particle track (FIG. 6b), that the particles are guided more uniformly than in the cyclone "Type Standard". The air guidance in the inlet region has an increased air velocity, which, however, decreases strongly over the height. However, this is not too much of a problem with small unfilled granulates with a lower specific weight, as the air can continue to hold the granulates at the circumference for a sufficiently long time.

In the conical cooling silo with inner shell "Type 2 (conical)" according to the invention (FIG. 6a, 6b, right column), it is possible to keep the air flow largely constant over the height. Although the diameter of the silo decreases, this leads to a longer residence time of the granulates in the cooling silo. Furthermore, the air flow is sufficiently high that even specifically heavier granulates can be kept in the spiral and thus remain sufficiently separated and can be solidified/cooled accordingly.

The invention claimed is:

1. A device for cooling particulate materials or particles, comprising:
    an outer container with an outer shell surface; and
    an inner container, which is arranged at least in sections in an interior of the outer container, with an inner shell surface,
    wherein an intermediate space is formed between the outer shell surface and the inner shell surface,
    wherein an inlet equipment for introducing a gas flow and the particles into the intermediate space is provided in an inlet-side initial region of the device, and
    wherein an outlet opening for the particles is provided in an outlet-side end region of the device opposite the inlet equipment,
    wherein the inlet equipment is arranged and/or designed in such a way that the gas flow and the particles can be introduced substantially tangentially into the intermediate space,
    the inlet equipment has an inlet channel and, an inlet nozzle which is arranged upstream thereof and via which the gas and particle flow can be fed, wherein the inlet channel is of curved design and runs parallel to a circumference of the outer shell surface and of the inner shell surface, and opens into the intermediate space essentially tangentially
    and in that the inlet channel closes the intermediate space on the inlet side.

2. The device according to claim 1, wherein the outer shell surface and/or the inner shell surface are arranged substantially rotationally symmetrically about a central longitudinal axis.

3. The device according to claim 1, wherein the outer shell surface and/or the inner shell surface is inclined relative to a central longitudinal axis by a cone angle (β), wherein the cone angle (β) is in a range of 1°<=β<=15°.

4. The device according to claim 1, wherein the outer shell surface and the inner shell surface are spaced apart from one another on all sides without contact.

5. The device according to claim 1, wherein the outer shell surface and the inner shell surface are aligned parallel to one another.

6. The device according to claim 1, wherein a width (a) of the intermediate space between the outer shell surface and the inner shell surface is in a range 20 mm<=a<=200 mm.

7. The device according to claim 1, wherein a width (a) of the intermediate space between the outer shell surface and the inner shell surface decreases uniformly in a direction of the outlet-side end region.

8. The device according to claim 1, wherein a width (a) of the intermediate space between the outer shell surface and the inner shell surface increases uniformly in a direction of the outlet-side end region.

9. The device according to claim 1, wherein a length or height (ha) of the outer container or of the outer shell surface is greater than the length or height (hi) of the inner container or of the inner shell surface, wherein a ratio (hi):(ha) is in a range from 0.1 to less than 1.

10. The device according to claim 1, wherein the outer shell surface and the inner shell surface are flush at their inlet-side initial regions.

11. The device according to claim 1, wherein the outer shell surface extends further or is longer than the inner shell surface in a direction of the outlet-side end region.

12. The device according to claim 1, wherein the diameter (da1) of the outer shell surface at the inlet-side initial region is greater than its diameter (da2) at the outlet-side end region, or in that the outer container tapers in a direction of the outlet-side end region.

13. The device according to claim 1, wherein in that a diameter (di1) of the inner shell surface at the inlet-side initial region is greater than its outlet-side diameter (di2) at the outlet-side end region, or wherein the inner container tapers in a direction of the outlet-side end region.

14. The device according to claim 1, wherein the outer shell surface and the inner shell surface taper in a direction of the outlet-side end region.

15. The device according to claim 1, wherein the opening of the outer shell surface defined by a diameter (da2) at the outlet-side end region or an area defined by the diameter of the outlet opening is reduced relative to the opening of the inner shell surface defined by the diameter (di2) at the outlet-side end region in such a way that sufficient flow resistance is formed for the gas to effect separation of the particles from the gas.

16. The device according to claim 1, wherein a tapering outlet nozzle is arranged at the outlet-side end region of the outer shell surface, in which the outlet opening is provided, via which the particle flow exits the device, wherein an area of the outlet opening is <=20% of an area of the opening, defined by a diameter (da2) at the outlet-side end region, of the outer shell surface.

17. The device according to claim 1, wherein the inner shell surface is open or gas-permeable at its end close to the inlet-side initial region, or is optionally provided with a gas-permeable cover surface.

18. The device according to claim 1, wherein the inlet channel has the same width (a) as the intermediate space.

19. The device according to claim 1, wherein the inlet channel opens into the intermediate space at an angle (α) with respect to a plane aligned normal to a longitudinal axis, wherein the angle (α) is in a range of 0<α<=10°, wherein it is provided that the inlet channel is uniformly inclined at the angle (α) over its entire longitudinal extent.

20. The device according to claim 1, wherein additional gas inlet openings are formed in the outer shell surface and/or in the inner shell surface, which openings are arranged and/or designed in such a way that gas can be introduced, essentially tangentially, into the intermediate space via these gas inlet openings.

21. The device according to claim 3, wherein the outer shell surface and/or the inner shell surface is inclined relative to a central longitudinal axis by a cone angle (β), wherein the cone angle (β) is in a range of 3°<=β<=10°.

22. The device according to claim 3, wherein the outer shell surface and/or the inner shell surface is inclined relative to a central longitudinal axis by a cone angle (β), wherein the cone angle (β) is in a range of 3°<=β<=6°.

23. The device according to claim 6, wherein the width (a) of the intermediate space between the outer shell surface and the inner shell surface is in a range 50 mm<=a<=100 mm.

24. The device according to claim 6, wherein the width (a) of the intermediate space between the outer shell surface and the inner shell surface is in a range 60 mm<=a<=80 mm.

25. The device according to claim 9, wherein the ratio (hi):(ha) is in a range from 0.3 to 0.85.

26. The device according to claim 9, wherein the ratio (hi):(ha) is in a range from 0.50 to 0.75.

27. The device according to claim 16, wherein the area of the outlet opening is <=10% of the area of the opening, defined by the diameter (da2) at the outlet-side end region of the outer shell surface.

28. The device according to claim 1, wherein the outer shell surface and the inner shell surface are frustoconical.

* * * * *

UNITED STATES PATENT AND TRADEMARK OFFICE
CERTIFICATE OF CORRECTION

PATENT NO. : 11,504,884 B2
APPLICATION NO. : 17/602231
DATED : November 22, 2022
INVENTOR(S) : Michael Aigner et al.

It is certified that error appears in the above-identified patent and that said Letters Patent is hereby corrected as shown below:

On the Title Page

Item (73) Assignee, delete "EREMA Engineering Recycling Maschinen und Antagen Gesellschaft m.b.H., Ansfelden (AT)" and insert with --EREMA Engineering Recycling Maschinen und Anlagen Gesellschaft m.b.H., Ansfelden (AT)--.

Signed and Sealed this
Twenty-fourth Day of January, 2023

Katherine Kelly Vidal
*Director of the United States Patent and Trademark Office*